A. McCLAIN.
Animal-Trap.
No. 225,624. Patented Mar. 16, 1880.
Fig. 1.
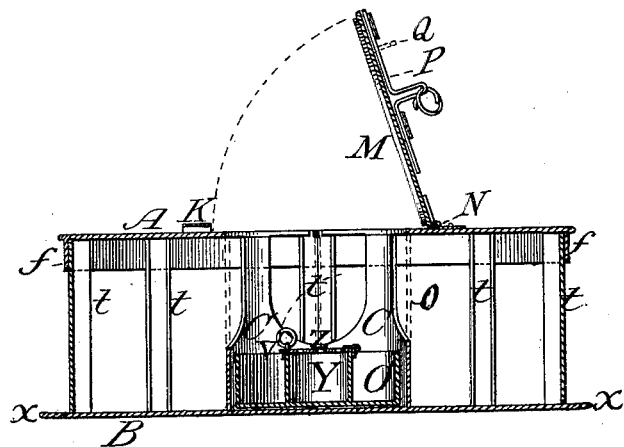
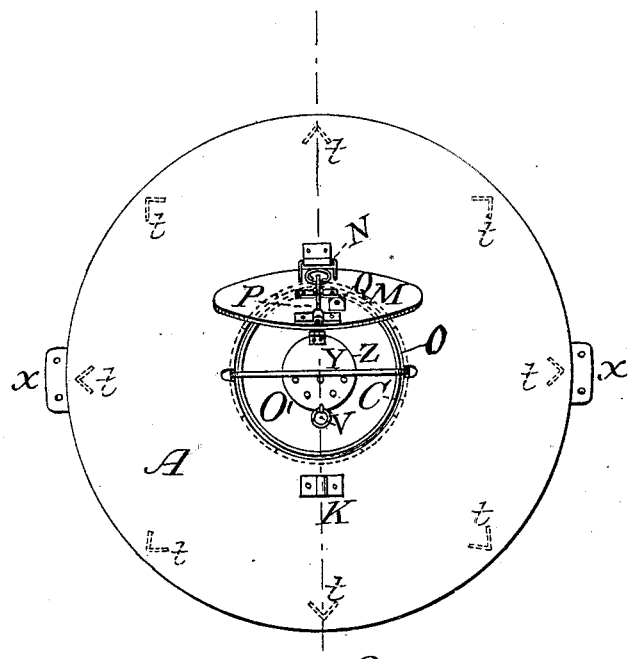
Fig. 2.
Attest:
J. B. Sand
E. L. Laurent
Inventor.
Andrew McClain
By Gilmore, Smith & Co.
Attys.

UNITED STATES PATENT OFFICE.

ANDREW McCLAIN, OF NASHVILLE, TENNESSEE.

ANIMAL-TRAP.

SPECIFICATION forming part of Letters Patent No. 225,624, dated March 16, 1880.

Application filed July 24, 1879.

*To all whom it may concern:*

Be it known that I, ANDREW McCLAIN, of Nashville, in the county of Davidson and State of Tennessee, have invented certain new and useful Improvements in Implements for the Destruction of Rats and Mice; and I do hereby declare that the following is a full, clear, and exact description of the same, reference being had to the accompanying drawings, making a part of this specification, in which—

Figure 1 is a vertical sectional view, and Fig. 2 is a plan view, of an implement embodying the improvements in my invention.

The invention relates to implements for the destruction of rats and mice; and it consists of a base provided with a receptacle having openings and a top plate united to said base by uprights, and having a lid, in combination with a removable vessel, which can be inserted and withdrawn through an opening in said top plate, which may be securely closed by said lid. Said removable vessel is provided with a perforated bait-chamber, as will be hereinafter fully described, and particularly pointed out in the claim.

B is the base, and $x$ $x$ are ears by which the device is fastened down. A is the top plate, and $t$ are uprights which connect the base and top plate. $f$ is a flange depending from the top plate, A.

A circular receptacle, O, is secured between the base B and the top plate, A, and is provided with openings, each cut in the shape of a scallop, and extending about half the length of said receptacle, beginning at the top.

The top plate, A, has a circular hinged lid, M, of the size to close the opening in said top plate, A, through which the vessel O' is inserted into the receptacle O, and a rolling and sliding bolt, P, having a curve, is attached to the lid M. The top plate, A, is also provided with a keeper, K, to receive the point of the bolt P, which, when so pushed forward, is held in that position by turning its curve over the staple Q, through which a lap-ring is then passed, and the hinged lid M is thus securely locked.

The vessel O' has a bait-chamber, Y, with a perforated lid, Z, secured by a staple and a lap-ring, V. N represents the hinge of the lid M.

The vessel O' fits loosely in the receptacle O, and the upper edge of the vessel O' is lower than the lowest edges of the openings C.

Strong-scented bait is placed in the bait-chamber Y, and poison, mixed with such food as rats and mice will eat with avidity, is placed in the vessel O' around the bait-chamber Y. Any particles of the poisonous mixture drawn by rats and mice over the edge of vessel O' fall into the receptacle O in the intervening space between vessel O' and receptacle O. The rats and mice are attracted by the scent of the bait in the bait-chamber, and by the scent of the poisonous mixture, and approach the same by passing between the base B and the upper plate, A, and pass their heads through the openings C, and in their efforts to get the bait in the bait-chamber Y, which is securely locked, they are brought into direct contact with the poisonous mixture, which they will eat and thus be destroyed, while at the same time the poison is inaccessible to children of tender years and all animals of value to man.

Having thus fully described my invention, what I claim as new and useful, and desire to secure by Letters Patent, is—

The base B, provided with the receptacle O, having openings C, and the top plate, A, united thereto by the uprights $t$, and provided with the lid M, in combination with the removable vessel O', having the bait-chamber Y, substantially as and for the purposes set forth.

ANDREW McCLAIN.

Witnesses:
  J. B. SAND,
  E. L. LAURENT.